(12) United States Patent
Andrews et al.

(10) Patent No.: US 8,963,842 B2
(45) Date of Patent: Feb. 24, 2015

(54) INTEGRATED HARDWARE AND SOFTWARE USER INTERFACE

(75) Inventors: Michael J. Andrews, Plymouth, MI (US); Michael D. Tschirhart, Ann Arbor, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 1079 days.

(21) Appl. No.: 11/620,638

(22) Filed: Jan. 5, 2007

(65) Prior Publication Data

US 2008/0164982 A1    Jul. 10, 2008

(51) Int. Cl.
*G06F 3/041*    (2006.01)
*G06F 3/01*    (2006.01)
*G06F 3/0488*    (2013.01)

(52) U.S. Cl.
CPC .......... *G06F 3/016* (2013.01); *G06F 3/04886* (2013.01)
USPC .......... 345/173; 345/156; 345/169; 715/702; 434/113; 340/407.1

(58) Field of Classification Search
USPC .......... 340/407.2, 407.1; 345/156, 173, 169; 341/20, 21, 22; 348/61, 62; 434/112, 434/113; 715/702
See application file for complete search history.

(56) References Cited

U.S. PATENT DOCUMENTS

| | | | | |
|---|---|---|---|---|
| 4,940,346 A | * | 7/1990 | Liljenquist | 400/487 |
| 5,598,527 A | * | 1/1997 | Debrus et al. | 345/173 |
| 5,742,476 A | * | 4/1998 | Miyazaki et al. | 361/679.21 |
| 5,748,185 A | * | 5/1998 | Stephan et al. | 345/173 |
| 6,049,328 A | | 4/2000 | Vanderheiden | |
| 6,757,002 B1 | * | 6/2004 | Oross et al. | 715/864 |
| 7,453,442 B1 | * | 11/2008 | Poynter | 345/173 |
| 8,100,594 B2 | * | 1/2012 | Chaumont et al. | 400/472 |
| 2001/0012000 A1 | * | 8/2001 | Eberhard | 345/173 |
| 2002/0044155 A1 | * | 4/2002 | Becker | 345/684 |
| 2002/0070915 A1 | * | 6/2002 | Mazza et al. | 345/156 |
| 2003/0103032 A1 | * | 6/2003 | Wong et al. | 345/156 |
| 2004/0066422 A1 | * | 4/2004 | Chandane | 345/865 |
| 2005/0012723 A1 | * | 1/2005 | Pallakoff | 345/173 |
| 2005/0062729 A1 | * | 3/2005 | Hinckley et al. | 345/173 |
| 2006/0236263 A1 | * | 10/2006 | Bathiche et al. | 715/786 |
| 2007/0257889 A1 | * | 11/2007 | Croy | 345/170 |
| 2008/0150911 A1 | * | 6/2008 | Harrison | 345/173 |

FOREIGN PATENT DOCUMENTS

DE    3123596    6/1981
EP    1 098 241 A3    5/2003
(Continued)

OTHER PUBLICATIONS

UK Search Report for application No. GB0721821.7 dated Feb. 26, 2008.

*Primary Examiner* — Koosha Sharifi-Tafreshi
(74) *Attorney, Agent, or Firm* — Dickinson Wright PLLC

(57) ABSTRACT

An integrated user interface has a sensory surface operable to receive a selection signal from a user and send a corresponding command signal within a software system. The integrated user interface has a plurality of tactile features operable to provide a user with tactile feedback corresponding to the selection signal received by the sensory surface when simultaneously selected by the user. A method of integrating the hardware and software functionality for a user interface is also disclosed.

10 Claims, 2 Drawing Sheets

(56) References Cited

FOREIGN PATENT DOCUMENTS

| | | |
|---|---|---|
| EP | 1 408 397 A3 | 2/2006 |
| JP | 03105462 A * | 5/1991 |
| JP | 08194856 A * | 7/1996 |
| WO | WO 2006/027434 | 3/2006 |

* cited by examiner

INTEGRATED HARDWARE AND SOFTWARE USER INTERFACE

BACKGROUND

1. Field of the Invention

The present invention generally relates to user interfaces for sensory surfaces. More particularly, the invention relates to user interfaces for sensory surfaces having touch-sensitive functionality.

2. Description of Related Art

Display screens of electronic devices often include user interfaces, through which the user can make selections related to various images displayed on the display screen. For example, on a mobile telephone, a user types a telephone number using keys, which causes the telephone number to be displayed on the screen. When the user presses a "call" or "talk" button, the screen shows that the telephone is proceeding to dial the number entered.

Current display applications can generally be categorized into two major types: 1) display screens with off-screen, hard-button controls, and 2) display screens with touch screen capability. Some devices allow use of both types of functionality. For example, a personal digital assistant (PDA) may allow a user to select images either by use of a touch screen or by use of a hard button. Other devices have provided some integration of hard and soft features by locating hard buttons next to a screen, such that a hard button may be pushed in order to select an icon located on the display screen adjacent to the hard button.

Touch screens may allow a greater amount of functionality than hard buttons because the displays provided by the software can be changed throughout different navigation screens, which allows more customization and configurability with different functionality on different screens. The software program can properly re-label each touch screen selection button as the user navigates through various touch screens, which saves the user from having to use "shift" functions/operations and keeps the number of necessary hard buttons to a minimum.

However, touch screens may be more difficult for users to operate than conventional hard buttons, because a user may have difficulty determining exactly where the touch screen button is located or how far to move a slide-type button or box across a display screen to obtain the desired functionality. In other words, a user may have difficulty determining the location of the touch screen virtual button. This difficulty may occur because the user does not receive the same type of sensory feedback from a touch screen that the user would receive from hard buttons (the feeling of a detent, or the sound of several rotary clicks, for example) and from the fact that if the touch screen is integrated into an automobile, the user may not be looking directly at the touch screen. In other words, dedicated touch screen functions occupy a higher degree of a user's visual load and attention load than hard buttons or rotary knobs do.

A device that requires a high degree of a user's visual, attention, or cognitive load is problematic because users desire to operate several devices simultaneously and/or attend to a primary task without having to dedicate all of their visual senses to one device. For example, a user may desire to increase the volume on a hands-free speaker phone while driving a vehicle. If the volume function exists only as a virtual slide button on a touch-screen, the user may have difficulty locating and safely sliding the virtual volume button to the desired level while attending to the primary task of driving.

In view of the above, it is apparent that there exists a need for a touch-sensitive user interface that lends itself to non-visual use.

SUMMARY

In satisfying the above need, as well as overcoming the enumerated drawbacks and other limitations of the related art, the present invention provides an integrated user interface having a sensory surface (such as a touch screen, capacitive touch sensor, field effect sensor, or other surface) operable to receive a motion or contact signal from a user and send a corresponding command signal within a software system. A bezel feature is positioned adjacent the sensory surface. The bezel feature has a plurality of tactile features, which are operable to provide a user with tactile feedback corresponding to the motion or contact signal received by the sensory surface.

In another aspect, a method of integrating hardware and software functionality for a user interface is provided. The method includes disposing a bezel structure adjacent to a sensory surface. The bezel structure has a plurality of tactile features, and the sensor surface has a software interface. The method further includes configuring the software interface such that the software interface is operable to receive selection signals from a user at a plurality of positions. The method includes configuring the location of at least a portion of the positions such that the positions physically correspond to the tactile features. The tactile features provide tactile feedback to the user corresponding to the selection signals received by the software interface.

Further objects, features and advantages of this invention will become readily apparent to persons skilled in the art after a review of the following description, with reference to the drawings and claims that are appended to and form a part of this specification.

DETAILED DESCRIPTION

Figure 1:
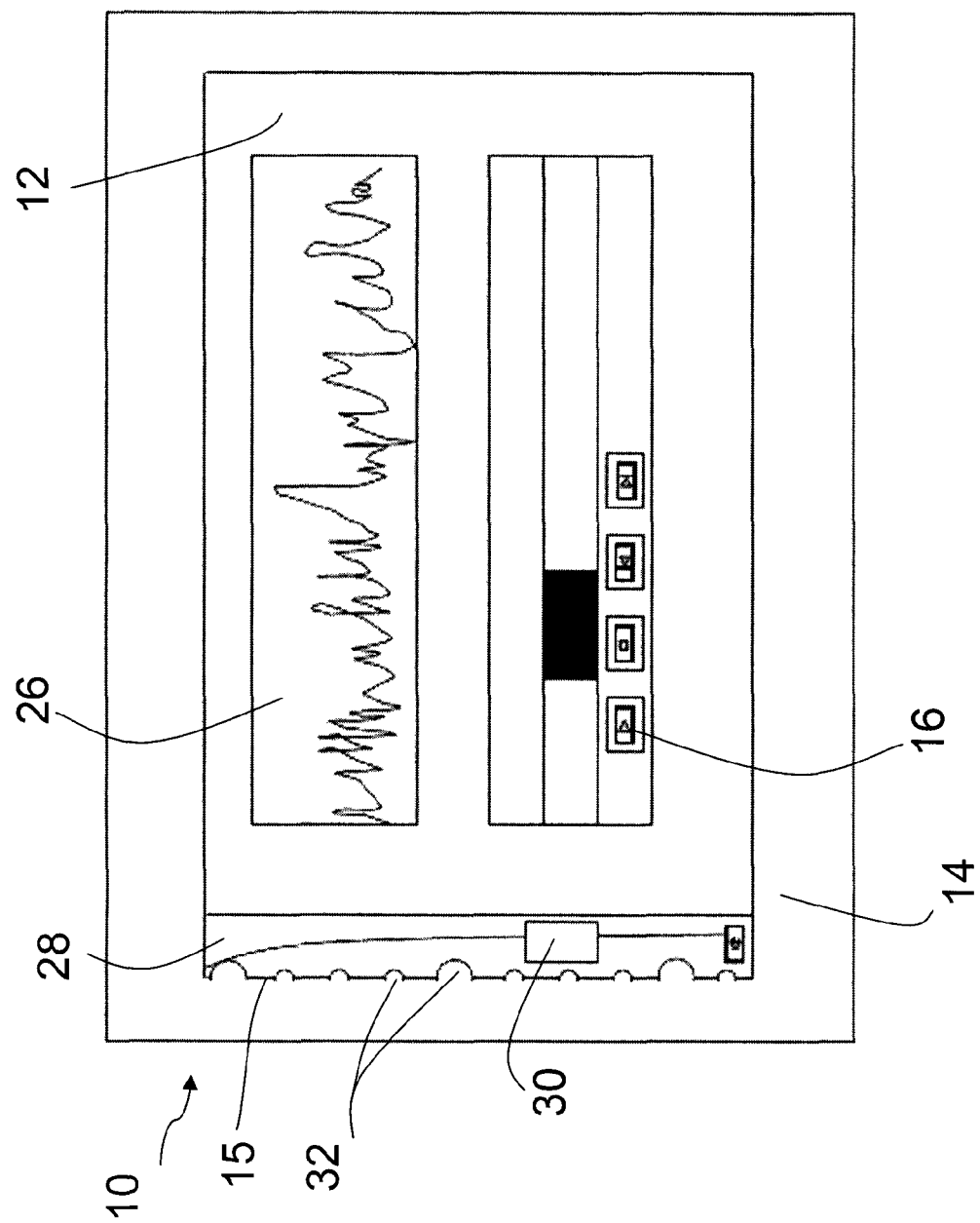
FIG. 1 is a front view of a first embodiment of an integrated user interface embodying the principles of the present invention.

Referring to FIG. 1, an integrated user interface embodying the principles of the present invention is illustrated therein and designated at 10. As its primary components, the integrated user interface 10 includes a sensory surface and a hardware component located adjacent thereto.

The sensory surface is a display screen 12 in the illustrated embodiment of FIG. 1. The sensory surface need not be a display screen; instead, the sensory surface could be any surface with sensory capabilities. For example, the sensory surface could be a capacitive surface, wherein motion or contact signals may be imparted to the surface from the user even though the surface lacks a display. Alternatively the sensory surface could be a camera-based surface, a field effect switch, or based on some other technology with similar functionality.

Various icons 16 or other visual displays 26 are located on the display screen 12, some of which are sensitive to touch. In other words, the icons 16 could have soft key functionality, also called "touch screen" functionality, as is known to one having ordinary skill in the art. The "touch screen" icons 16 are operable to receive a tactile, or touch, signal from a user and send a corresponding command signal, within a software system, in order to activate a desired functionality of the system. In the embodiment of FIG. 1, the icons 16 are operable to activate "Play", "Stop", "Fast Forward", and "Rewind" functions of an audio output signal. A visual display 26 provides a visual illustration of the audio output signal.

The display screen 12 may also include a volume control bar 28 that also has such "touch screen" capability. When a user touches the display screen 12 over a volume control box 30 pictured on the display screen 12, the user can "drag" the volume control box 30 upward or downward on the display screen 12, thereby increasing or decreasing the volume of an audio signal that is being played by speakers (not shown) connected to the device associated with the integrated user interface 10.

As mentioned above, the integrated user interface 10 includes a hardware component. In the illustrated embodiment of FIG. 1, the hardware component is a frame or bezel 14 located adjacent to at least a portion of the display screen 12. The frame 14 includes tactile features 32, which may be of various sizes and shapes and may protrude over the surface of the display screen 12. As such, one configuration for the tactile features 32 is that of convex or raised bumps on the surface of the frame 14. The tactile features 32 are disposed adjacent the display screen 12 at the edge of the frame 14, along an edge 15 of the frame 14 that borders the display screen 12 such that a user's finger can simultaneously touch both the tactile feature 32 and the display screen 12. The software program interface utilized with the display screen 12 is designed so that at least some of the virtual buttons on the display screen 12, the volume control bar 28 and the volume control box 30 in FIG. 1, correspond to the tactile features 32 located on the frame 14. Thus, the hardware and software user interfaces are functionally integrated with each other.

As a user slides the control box 30 upward, the user's finger contacts the tactile features 32. Therefore, the tactile features 32 provide the user with feedback on how far the user has moved the volume control box 30 because the user can feel the number of tactile features 32 that he/she has dragged the control box 30 past. Because the user receives tactile feedback from the tactile features 32, the user knows with certainty, without exerting much visual effort, the volume level that the user is setting along the volume bar 28 on the display screen 12.

A second embodiment of an integrated user interface embodying the principles of the present invention is illustrated generally at 110. Like the first embodiment, the integrated user interface 110 has a display screen 112 surrounded by a frame 114. Icons 116, 118, 120, 122, 124 having "touch screen" capability and other visual displays 126 are viewable on the display screen 112.

Provided along at least a portion of the frame 114 is a bezel feature 115 that is disposed adjacent the display screen 112, partially extending over the display screen 112. The bezel feature 115 includes tactile features 132, 134, 136, 138, 140. The software program interface utilized with the display screen 112 is designed so that the locations of the icons 116, 118, 120, 122, 124 correspond to the locations of the tactile features 132, 134, 136, 138, 140. Thus, the hardware and software user interfaces are integrated with each other.

Figure 2:
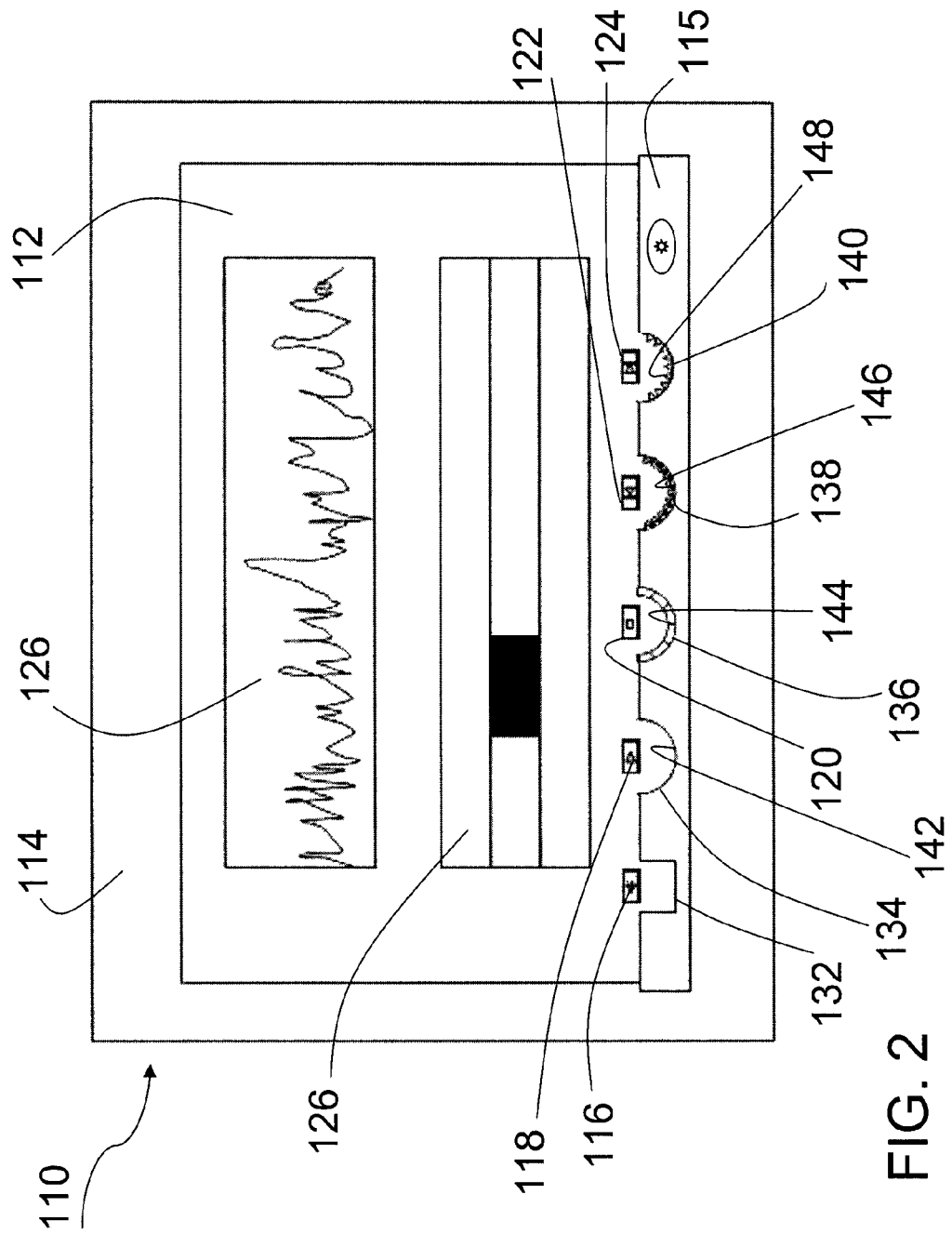
FIG. 2 is a front view of a second embodiment of an integrated user interface embodying the principles of the present invention.

The tactile features 134, 136, 138, 140 of the embodiment shown in FIG. 2 are generally concave and have surface characteristics 142, 144, 146, 148 located along the concave surfaces of the tactile features 134, 136, 138, 140. The surface characteristics 142, 144, 146, 148 of the several tactile features 118, 120, 122, 124 differ from each other. This is intended to provide the user with tactile feedback on which icon the user has selected using the touch screen capability, without requiring much visual effort on the part of the user.

For example, in FIG. 2, if the user desires to push the "Play" icon, and thereby activate an associated device so as to produce an audio or video output, the user places his/her finger within the concave tactile feature 132 having the smooth surface characteristic 142, which directs his/her finger into contact with the "Play" icon 118 on the display screen 112. Likewise, if the user wishes to "Fast Forward" the audio or video output, the user places his/her finger into the concave tactile feature 140 having a pointed toothed surface characteristic 148, which brings his/her finger into contact with the "Fast Forward" or skip forward icon 124 on the display screen 112, thereby activating the "Fast Forward" selection. Similarly, the "Rewind" or skip back icon 122 and the "Stop" icon 120 are provided with a different surface characteristics 146, 144, such as a rounded toothed surface and segmented surface, respectively.

One of the concave tactile features 132 may be provided with a different basic structure from the other tactile features 134, 136, 138, 140. For example, the tactile feature 132 having the "Sound" icon 116 associated with it may be provided with a rectangular concave structure, while the other tactile features 134, 136, 138, 140 are provided with a circular or rounded structure. Likewise, other tactile surfaces could correspond to other functions.

Because the user can feel either the differing structures of the tactile features 132, 134, 136, 138, 140 or their differing surface characteristics 142, 144, 146, 148, the tactile features 132, 134, 136, 138, 140 provide the user with tactile feedback on which icon 116, 118, 120, 122, 124 the user is selecting with the "touch screen" feature of the display screen 112. The integrated user interface 110 therefore is intended to allow the user to make "touch screen" selections without exerting much visual effort because the user is able to determine which icons 116, 118, 120, 122, 124 he/she is selecting based on his/her sense of touch. After becoming familiar with the display features and functions of a particular software program on the display screen 112, the user is likely to remember which tactile features 132, 134, 136, 138, 140 correspond to which functions, based on how they feel.

The present invention also contemplates a method for integrating hardware and software functionality for a user interface 10. The method includes disposing a bezel structure adjacent a sensory surface, such as a display screen 12 having a software interface. The bezel structure has a plurality of tactile features 32 substantially similar as those described above, with reference to either FIG. 1 or FIG. 2, which are herein incorporated by reference.

The method further includes configuring the software interface such that the software interface is operable to receive tactile signals from a user at various positions on the display screen 12. In other words, the display screen is configured with "touch screen" capabilities. The sensory surface could alternatively be a capacitive surface that is operable to react to touch, or any other sensory surface that can be configured to be sensitive to touch or near field motion.

Furthermore, the method contemplated by the present invention involves configuring the location on the screen of at least a portion of the positions capable of receiving the tactile signals such that the locations and positions physically correspond to the tactile features 32, enabling the tactile features 32 and the positions on the display screen 12 to be simultaneously touched by the user of the interface 10. The system can be configured so that some of the positions correspond to the tactile features 32, such as the volume control box 30, but others do not, such as a fixed position icon 16. As a result of the present invention, the tactile features 32 provide tactile feedback to the user corresponding to the tactile signals received by the software interface when the sensory surface is touched by the user.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. An integrated user interface comprising:
    a sensory surface configured to receive a selection signal from a user resulting in a corresponding command signal within a software system;
    at least a portion of a frame positioned adjacent to the sensory surface,
        the frame having an edge and the edge defining a plurality of tactile features located immediately adjacent to the sensory surface whereby
        the selection signal can be received by the sensory surface upon simultaneously contact of the sensory surface and a tactile feature of the plurality of tactile features by a single finger of a user, each of the tactile features in the edge of the frame having a surface configuration that is different from the others of the tactile features of the frame and providing a user with distinguishable tactile feedback corresponding to each of the command signals and corresponding to the selection signal respectively received by the sensory surface,
    wherein the plurality of the tactile features have a concave structure on the edge of the frame, wherein each of the tactile feature's concave structure defines a separate circular portion adjacent to the corresponding selection signal,
    each of the plurality of the tactile features have a unique shape from each of the other plurality of the tactile features, the unique shape residing on the circular portion of the corresponding tactile feature, the circular portion being perpendicular to the sensory surface.

2. The integrated user interface of claim 1, wherein each tactile feature has a different surface characteristic from the others of the tactile features, the different surface characteristics providing different tactile feedback to the user.

3. The integrated user interface of claim 2, wherein the surface characteristic of at least two of the tactile features are different from one another.

4. The integrated user interface of claim 2, wherein the surface characteristic of adjacent ones of the tactile features are different from one another.

5. The integrated user interface of claim 1, wherein a first tactile feature of the plurality of tactile features differs in structure from a second tactile feature of the plurality of tactile features.

6. The integrated user interface of claim 1, wherein a first tactile feature of the plurality of tactile features differs in size from a second tactile feature of the plurality of tactile features.

7. The integrated user interface of claim 1, wherein the sensory surface is a display screen.

8. The integrated user interface of claim 1, wherein the sensory signal is operable to receive the selection signal by way of touch.

9. The integrated user interface of claim 1, wherein the tactile features protrude over the sensory surface.

10. The integrated user interface of claim 1, wherein a first tactile feature of the plurality of tactile features is defined by a first surface configuration, and a second tactile feature of the plurality of tactile features is defined by a second surface configuration, the first surface configuration being a different shape than the second surface configuration.

* * * * *